(12) United States Patent
Roy et al.

(10) Patent No.: US 8,442,046 B2
(45) Date of Patent: May 14, 2013

(54) SENDING ROUTING PROTOCOL DATA ON A MULTI-ACCESS NETWORK SEGMENT

(75) Inventors: Abhay Roy, Cupertino, CA (US); Alfred Lindem, III, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 449 days.

(21) Appl. No.: 11/694,857

(22) Filed: Mar. 30, 2007

(65) Prior Publication Data

US 2008/0240118 A1 Oct. 2, 2008

(51) Int. Cl.
*H04L 12/28* (2006.01)

(52) U.S. Cl.
USPC .......................................... 370/390; 370/398

(58) Field of Classification Search ........................ None
See application file for complete search history.

(56) References Cited

U.S. PATENT DOCUMENTS

| | | | | |
|---|---|---|---|---|
| 5,978,384 | A * | 11/1999 | Kotchey | 370/445 |
| 2003/0067924 | A1* | 4/2003 | Choe et al. | 370/400 |
| 2003/0179742 | A1* | 9/2003 | Ogier et al. | 370/351 |
| 2009/0279516 | A1* | 11/2009 | Kok et al. | 370/338 |

OTHER PUBLICATIONS

R. Coltun, D. Ferguson and J. Moy, OSPF for IPv6, RFC/RFC2740. txt, Dec. 1, 1999, Page(s) 80pp., Publisher: Internet Engineering Task Force, Published in: Internet, www.ietf.org.

* cited by examiner

*Primary Examiner* — Faruk Hamza
*Assistant Examiner* — Tito Pham
(74) *Attorney, Agent, or Firm* — Patent Capital Group

(57) ABSTRACT

In one embodiment, a method includes setting a re-flood time to a non-zero first value. Update data that indicates a change to link data is received over a network interface from an updating node of multiple nodes on a multi-access segment connected to the interface. The change is to link data that indicates links on the updating node. It is determined whether an acknowledgment message is not received within the re-flood time from a particular node of the multiple nodes. If an acknowledgment message is not received within the re-flood time, then a multicast packet directed to the multiple nodes and including the change to the link data is sent over onto the segment. This method enables rapid response to failure of a primary node designated to ensure reliable flooding of link data.

20 Claims, 4 Drawing Sheets

SENDING ROUTING PROTOCOL DATA ON A MULTI-ACCESS NETWORK SEGMENT

BACKGROUND OF THE INVENTION

1. Field of the Invention

The present invention relates to passing routing information, such as used in the Open Shortest Path First (OSPF) protocol, and in particular to sending routing information on a multi-access network segment.

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a node that is configured to originate or terminate communications over the network. An intermediate network node facilitates the passage of data between end nodes.

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links.

A link-state protocol is an example of a routing protocol, which only exchanges control plane messages used for routing data packets sent in a different routed protocol (e.g., the Internet Protocol, IP). For example, the Open System Interconnection (OSI) protocol suite and the Open Shortest Path First (OSPF) routing protocol are link state protocols. A link-state protocol method floods routing information to all nodes in a controlled area of the internetwork in a link-state protocol control plane data packet. Link-state data indicates direct links between a network node that performs routing functions (a router) and a different router on the same network segment, which does not involve an intervening router. Link-state updates sent over a segment are acknowledged by other routers on that segment, for reliability. According to link-state protocol methods, each router builds a model of the entire area of the network in its routing tables based on the link-state data received from other routers.

When more than three routers share a network segment, the segment is a called a multi-access link. This is common in large networks and wireless networks. To save network resources (e.g., bandwidth on the multi-access segment and processing capacity on a network node), one of the routers on a multi-access segment is elected a designated router (DR) and a different router is designated a backup designated router (BDR). Instead of every router on the multi-access segment sending updates to every other router and receiving acknowledgments, each router sends update messages only to the DR and BDR. The DR resends the update message as a multicast to all nodes on the segment and waits for acknowledgements. If a node does not acknowledge the multicast within a configured time called the re-transmission time, then the DR sends a unicast to each unresponsive node. If the DR does not transmit a unicasts at the re-transmission time to an unresponsive node, then the BDR begins transmitting unicasts to the unresponsive nodes, which safeguards against a failure in the DR or its connection to the segment.

With current operations, including default values for the re-transmission time on the order of 5 seconds, the rescue of a failed DR by the BDR is not accomplished in times short enough for real-time data applications, such as voice and video conferencing.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
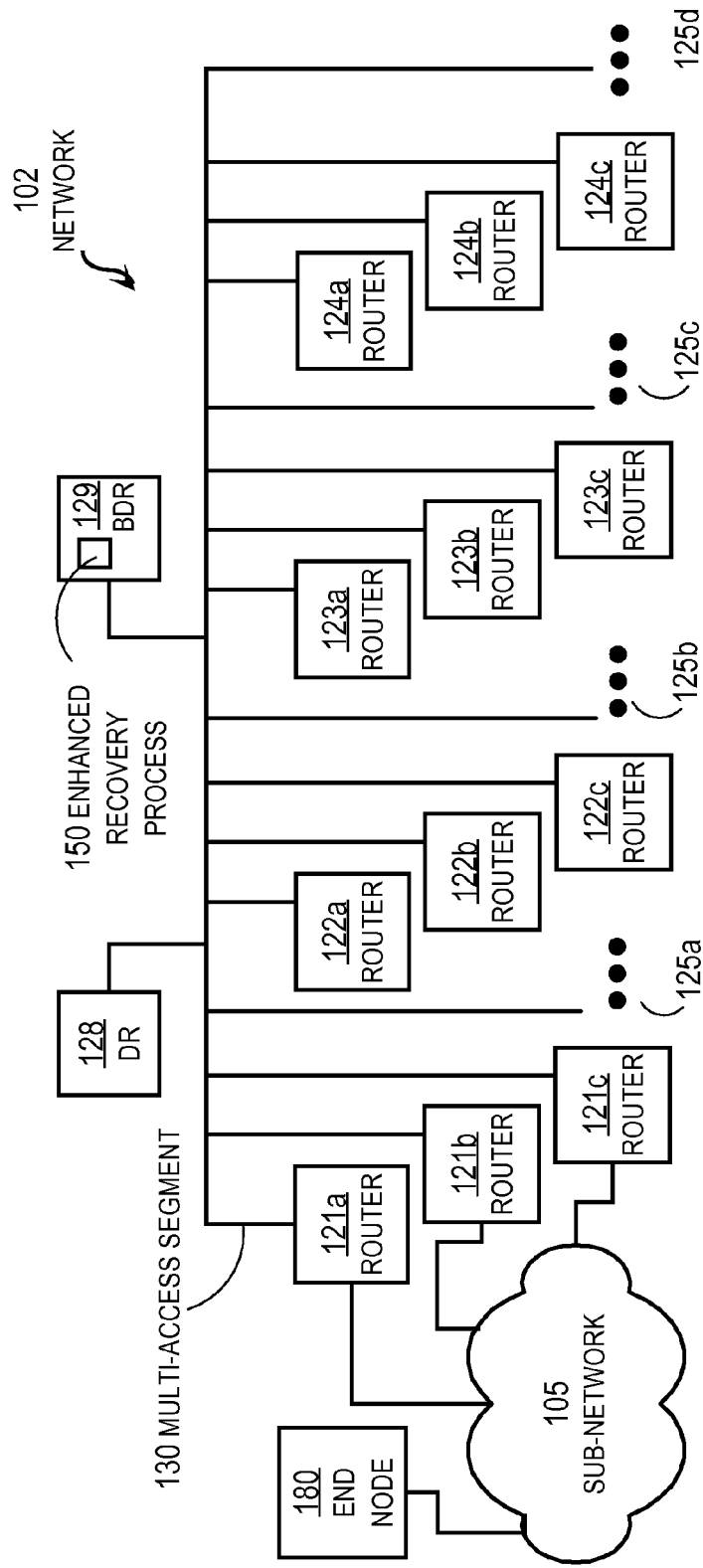
FIG. 1 illustrates an example network with a multi-access segment.

A method and apparatus are described for sending routing protocol data on a multi-access network segment. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described in the context of the Open Shortest Path First (OSPF) protocol; however, the invention is not limited to this protocol. In other embodiments, the context is another protocol, such as another link-state routing protocol that makes use of a backup router to ensure reliable passage of routing information.

1.0 Overview

In one set of embodiments, a method includes setting a re-flood time to a non-zero first value. Update data that indicates a change to link data is received over a network interface from an updating node of multiple nodes on a multi-access segment connected to the network interface. It is determined whether an acknowledgment message is not received within the re-flood time from a particular node of the multiple nodes. The particular node is different from the updating node. If an acknowledgment message is not received from the particular node within the re-flood time, then an outbound single multicast data packet is sent through the interface. The multicast data packet is directed to the multiple nodes and includes multicast data that indicates the change to the link data based on the update data.

In other sets of embodiments an apparatus or software is configured to perform one or more steps of the above method.

2.0 Network Overview

Each data packet exchanged between nodes in a network typically comprises 1] header information associated with a particular protocol, and 2] payload information that follows the header information and contains information that may be processed independently of that particular protocol. The header includes information such as the source of the packet, its destination, the length of the payload, and other properties used by the protocol. Often, the data in the payload for the particular protocol includes a header and payload for a different protocol associated with a different layer of detail for information exchange. For many protocols, the destination of a packet can include data that indicates a unique identifier for a particular destination node, such as a network address, and the packet is termed a unicast packet; or the destination can include a special code that indicates the packet is directed to any recipient node, and the packet is termed a "multicast" packet. Such a special code is called the multicast destination code.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Routers and switches are intermediate network nodes that determine which communication link or links to employ to support the progress of data packets through the network. A network node that determines which links to employ based on information in the internetwork header (layer 3) is called a router.

Some protocols pass protocol-related information among two or more network nodes in special control packets that are communicated separately and which include a payload of information used by the protocol itself rather than a payload of data to be communicated for another application. These control data packets and the processes at network nodes that utilize the control packets are said to be in another dimension, a "control plane," distinct from the "data plane" dimension that includes the data packets with payloads for other applications at the end nodes.

FIG. 1 illustrates an example network 102 with a multi-access segment 130. Network 102 includes an end node 180 a subnetwork 105 and a large number of intermediate network nodes: router 121a, router 121b, router 121c, router 122a, router 122b, router 122c, router 123a, router 123b, router 123c, router 124a, router 124b, router 124c, designated router (DR) 128, backup designated router (BDR) 129, and further routers represented by ellipses 125a, 125b, 125c, 125d, collectively referenced hereinafter as routers 120. The routers 120 are connected by multi-access network segment 130. A communication link on which there are no intervening intermediate network nodes is called a network segment. A multi-access segment is connected to more than two routers without intervening routers. Thus routers 120 are neighbors on a multi access segment. Each router 120 is often also connected to one or more other end nodes or subnetworks (not shown) like subnetwork 105 and end node 180.

While a certain number of nodes 120 and links in multi-access segment 130 are depicted in network 102 for purposes of illustration, in other embodiments, a network includes more or fewer nodes, such as routers and end nodes that are not neighbors of routers 120, and more or fewer links on the same number of more multi-access segments.

When a router experiences a change in its neighbors, it provides that change information to one or more neighbors in a routing protocol update message. For example, if router 121c loses its connection to sub-network 105, router 121c sends an update message that indicates this change.

Figure 2:
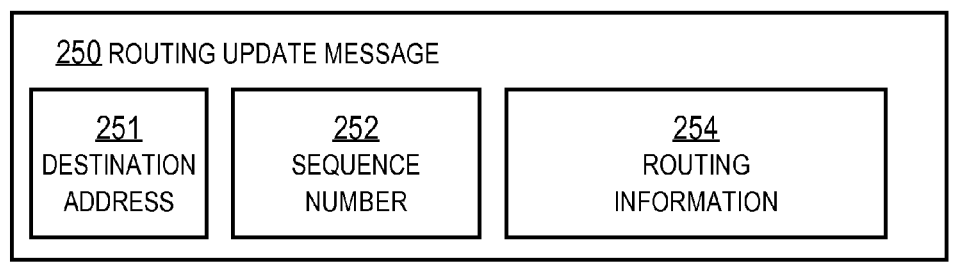
FIG. 2 illustrates an example routing update message.

FIG. 2 illustrates an example routing update message 250. Routing update message 250 includes a destination address field 251, a sequence number field 252 and a routing information field 254, among other fields (not shown). The destination address field 251 holds data that indicates a network node that is to process the data in the message 250. For example, in an OSPF update message, the destination address field 251 is an Internet Protocol destination address field in an IP header portion of update message 250. The sequence number field 252 holds data that indicates an order for processing data in the message 250. The routing information field 254 holds data that indicates routing information for updating the routing tables at each router. For example, the routing information holds one or more attribute value pairs that indicate the IP addresses of nodes that are current neighbors of the sending node. In some embodiments, the sequence number field 252 and routing information field 254 comprise one or more fields in an IP payload.

Although fields 251, 252 and 254 are shown as integral blocks of data in a particular order in message 250 for purposes of illustration, in other embodiments one or more fields or portions thereof occur in a different order as one or more blocks of data in a routing update message. In OSPF, the update message 250 is called a link state advertisement (LSA) update.

In some embodiments, the data in the destination address field 251 indicates a single router that is to process the message 250, and the message is said to be a unicast. Since each router has previously exchanged neighbor discovery messages, each router stores data that indicates what neighboring routers are directly connected on each network segment. Thus each router could unicast an update message to each neighbor. When there are large numbers of neighbors on a link, however, such unicasts are inefficient. For example, if there are 500 neighbor routers 120 on segment 130, then router 121c would have to send 499 unicast messages. Thus it is common practice to use multicasts on multi-access network segments. In a multicast routing update message, the data in the destination address field 251 indicates a group address. Each router holds data that indicates what groups it is a member of. If a multicast message is received with data in the destination address field 251 that indicates a group to which a router belongs, then the router processes that message. If not, the message is ignored by that router. Thus one message traversing the multi-access network is processed by multiple routers.

According to some protocols, including the OSPF protocol, to reliably propagate routing information, each update message sent on a segment is acknowledged by a router that receives and processes that update message. Due to noise or congestion on the segment, some routers may not receive the update message at all or may be so busy that they drop the message because their input buffers are full. If a known neighboring router does not respond in a reasonable time, then the update message is sent again as a unicast to the unresponsive neighboring router.

To prevent wasting network resources by having each router on a multi-access segment manage updates and acknowledgments for potentially hundreds and thousands of neighbors, one router (such as a router centrally located on the segment, or a router with extra memory and processing power) is elected a designated router (DR). The DR has primary responsibility for propagating update messages reliably to all neighboring routers on a multi-access segment. To protect against DR failure, a different second router is elected the backup designated router BDR. The BDR sends unicasts to the unresponsive neighbors if the DR does not do so, and continues such unicasts until a new DR is elected and takes over the task. In the illustrated embodiment, DR 128 and BDR 120 are elected to service reliable updates for multi-access network segment 130.

Any method may be used to elect the DR and BDR; for example, as described in the OSPF protocol. OSPF, and OSPF version 3 (OSPFv3) for IP version 6 addresses, are described at the time of this writing in Internet Engineering Task Force (IETF) request for comments (RFC) 2328 and RFC 2740, respectively. These RFCs can be found in files named rfc2328.txt and rfc2740.txt, respectively, which can be found, along with other RFC files, at the World Wide Web domain www.ietf.org in the file directory named rfc. The entire contents of RFC 2328 and RFC 2740 are hereby incorporated by reference as if fully set forth herein.

According to OSPF, non-designated routers (e.g., routers 120 on segment 130 other than DR 128 and BDR 129) flood LSA updates to the DR and BDR using an IP multicast group of which the DR and BDR are the only members. The DR, in turn, floods the LSA update to an IP multicast group including all OSPF routers on the multi-access segment. The BDR does not flood the update but adds it to a list of LSA re-transmissions for each neighbor on the multi-access segment. If the BDR does not receive an acknowledgement from each neighbor or a unicast from the DR for that neighbor in a time interval called the re-transmission time (usually, about 5 seconds), the BDR unicasts the LSA update to those unresponsive neighbors that did not send an acknowledgement.

In this approach, when a DR fails just before a non-designated router sends an update to the DR and BDR, no multicast is ever sent to the routers on the multi-access segment. Instead, the BDR starts a re-transmission timer to run for the re-transmission time. When the re-transmission timer expires, no router has acknowledged the multicast because no multicast was sent. The BDR then starts sending unicasts to every router on the segment. This causes delay in discovering the failed DR for at least the re-transmission time (about 5 seconds) plus some or all of the time it takes for the BDR to generate and send a large number of unicasts (e.g., hundreds to thousands of unicasts). The update is thus unavailable more than 5 seconds and the network can not converge to a new set of routes based on the change in neighbors for at least this long. This delay is noticeable and can lead to failure for real-time applications, such as voice and video conferencing and banking and trading transactions.

According to the illustrated embodiment, the BDR 129 includes an enhanced recovery process 150 that utilizes a multicast update for all routers on a multi-access segment even when a DR fails before the update is received from a non-designated router. In some embodiments, the enhanced recovery process 150 is available at every router 120, but is only executed when the router is elected as a BDR. The use of enhanced recovery process 150 speeds the recovery from a DR failure because it avoids unnecessarily generating and sending hundreds and thousands of unicasts to update routers on a multi-access segment.

In addition, in some embodiments, the multicast is sent from the BDR before the expiration of the re-transmission time to further speed the recovery from DR failure. Furthermore, in some embodiments in which the BDR detects a silent DR, the multicast is sent from the BDR immediately upon receipt of an update from a non-designated router, so that, in the absence of the original DR, the BDR behaves just like the DR until a new DR is elected.

3.0 Method at Backup Designated Router

Figure 3:
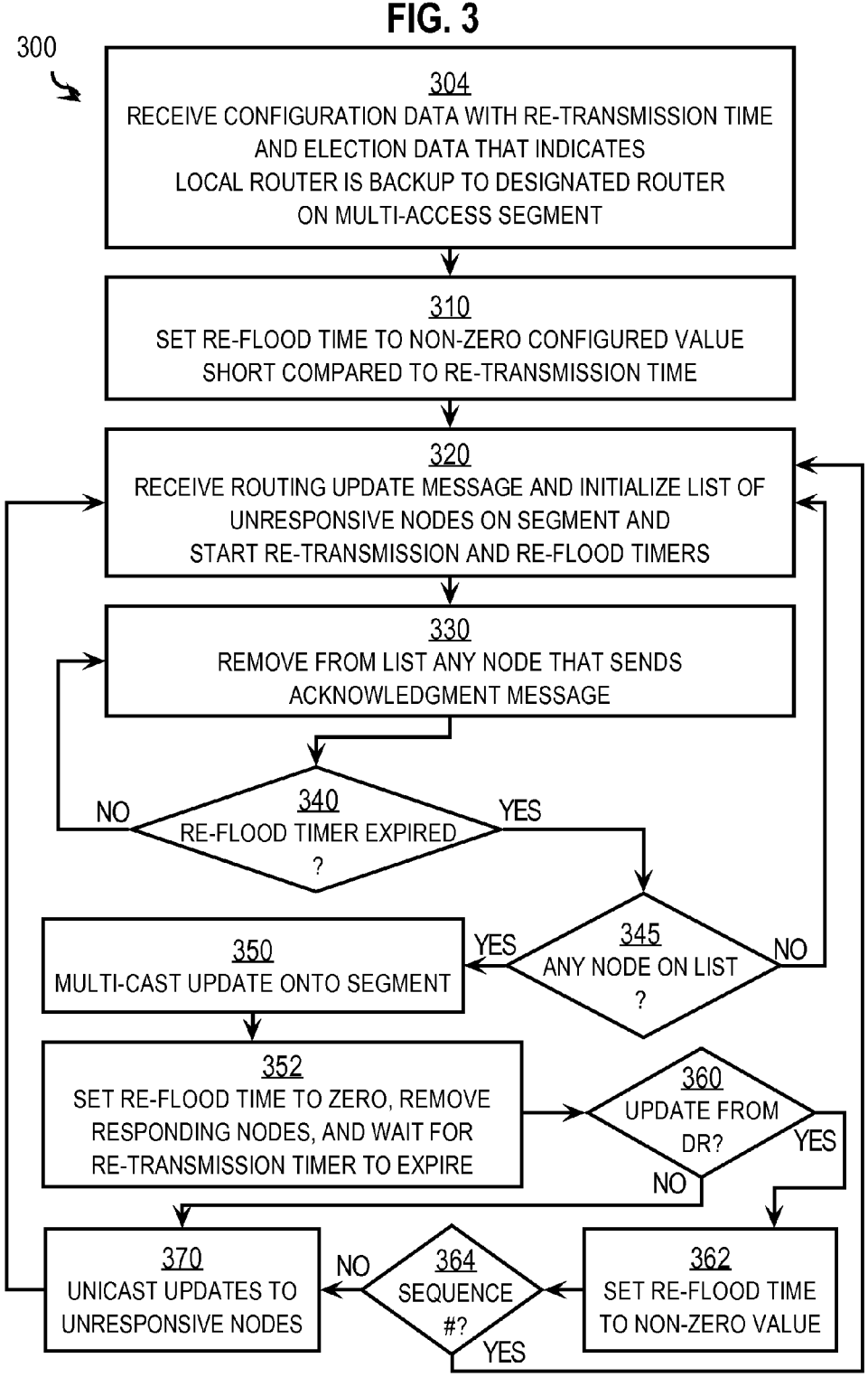
FIG. 3 illustrates an example method for a backup designated router on a multi-access segment.

FIG. 3 illustrates an example method 300 for a backup designated router on a multi-access segment. This embodiment exhibits all the features described above: multicast, multicast before expiration of the re-transmission timer, and multicast immediately when a silent DR is detected. Although steps in FIG. 3 are shown in a particular order for purposes of illustration, in other embodiments one or more steps may be performed in a different order or overlapping in time, on one or more processors executing in series or in parallel, or one or more steps may be omitted or added, or some combination of changes may be made. In some embodiments, one or more steps of method 300 are performed in hardware for which functions are represented in one or more state diagrams. In some embodiments with omitted steps, one or more of the features described above are not provided.

In step 304 configuration data and election data are received. Any method may be used to receive this data. For example, in various embodiments, the data is included as a default value in software instructions, is received as manual input from a network administrator on the local or a remote node, is retrieved from a local file or database, or is sent from a different node on the network, either in response to a query or unsolicited, or the data is received using some combination of these methods.

The configuration data includes data that indicates the re-transmission time, e.g., 5 seconds for default OSPF protocol, used between a multicast from a DR and the time to start unicasts from the DR or BDR to unresponsive neighbors. In some embodiments, the configuration data also includes data that indicates an inter-packet gap time, which is the time from the end of one packet sent over an interface to the beginning of the next packet sent, found from experience to reduce the occurrence of saturated router ingress buffers that lead to lost data packets. For example, in some embodiments, the inter-packet gap time is about 0.033 seconds, which is called the LSA pacing interval in the Internet Operating System (IOS) of CISCO SYSTEMS, INC.™ of San Jose Calif. In some embodiments, the configuration data includes data that indicates a non-zero default value for a re-flood time. As described in more detail below, the re-flood time indicates a time for sending a multicast from a BDR, which is not described or suggested in the OSPF protocol at the time of this writing.

The election data indicates which neighbor is the DR, i.e., the router that is primarily responsible for multicasting routing updates on the multi-access segment, and the election data indicates that the local route is the BDR, i.e., the backup for the DR. If the election data does not indicate that the local router is the BDR, then the method 300 is not executed on the local node. For purposes of illustration, it is assumed that the election data indicates DR 128 and BDR 129 on multi-access segment 130.

In step 310, a re-flood time is set equal to a non-zero value. As described in more detail below, the re-flood time indicates how long after a routing update message is received that the BDR issues a multicast. In OSPF, the DR issues a multicast immediately, but the BDR never issues a multicast. Thus the re-flood time is not defined or used in OSPF. In some embodiments, the non-zero value for the re-flood time is the same as the re-transmission time. In some embodiments, the non-zero value for the re-flood time is shorter than the re-transmission time. In the illustrated embodiments for networks that support real-time applications, the non-zero value for the re-flood time is substantially shorter than the retransmission time, about an order of magnitude or more shorter than the retransmission time (e.g., the non-zero value is less than 0.5 seconds)

to avoid noticeable or fatal delays in converging to replacement routes between end nodes. In some embodiments, the non-zero value for the re-flood time is set to a small factor of the inter-packet gap time (e.g., 2 or 3 times the LSA pacing interval, which result is about 0.05 seconds to about 0.1 seconds). For purposes of illustration, it is assumed that the non-zero value for the re-flood time is 0.1 seconds.

In step 320, a routing update message is received at the BDR from a non-designated router, called herein the updating router, on the multi-access segment. In response, during step 320, the BDR starts the re-flood timer at the re-flood time. The BDR also initializes a list of unresponsive nodes on the segment, e.g., by storing the update message and taking a value of the sequence number from the sequence number field 252 and placing that sequence number in a re-transmission queue associated in storage on the BDR with each router on the multi-access segment. In some embodiments, the sequence number is not added to the re-transmission queue for the updating router or the DR and the BDR is not listed in the re-transmission queue. In the illustrated embodiment, step 320 includes starting a re-transmission timer at the re-transmission time value. For example, a re-transmission timer is set to 5 seconds. In some embodiment, the re-transmission timer is started during step 350 instead, and is not started during step 320.

For purposes of illustration, it is assumed that an LSA update message with sequence number 7654321 is received at time 0.0 at BDR 129 from router 121c, and that routing information field 254 holds data that indicates loss of a link to sub-network 105. In response, the BDR starts the re-flood timer at the re-flood time of 0.1 seconds and starts the re-transmission timer at 5.0 seconds. The BDR also saves the update message and adds the sequence number 7654321 to the re-transmission queue for nodes 120 excluding itself, BDR 129, the DR 128, and the updating router 121c.

It is further assumed for purposes of illustration that DR has failed and does not issue a multicast update for sequence number 7654321 to the routers 120 on segment 130.

In step 330, the BDR removes from the list any node that sends an acknowledgment message, e.g., by removing the sequence number acknowledged from the re-transmission queue associated with the acknowledging node. For example, since no multicast was sent, no node sends an acknowledgment message and the sequence number 7654321 is not removed from the re-transmission queue for any node.

In step 340, the re-flood timer is advanced and it is determined whether the re-flood timer has expired. If not, control passes back to step 330 to process any acknowledgment messages received. However, if it is determined that the re-flood time has expired, then control passes to step 245. For example, after 0.1 seconds, control passes to step 345.

In step 345 it is determined whether any node remains on the list of un-responsive nodes, e.g., any router has the sequence number 7654321 in its re-transmission queue. If not, all nodes have acknowledged the update and control passes back to step 320 to get the next update, if any. However, if it is determined that any node remains on the list of un-responsive nodes, then control passes to step 350. For example, since the sequence number 7654321 is not removed from the re-transmission queue for any node, all remain on the unresponsive list and control passes to step 350.

In step 350, the BDR issues a multicast update over the multi-access segment. For example, the BDR 129 sends the routing information associated with sequence number 7654321 in a multicast update message 250 with a multicast IP address in field 251 that indicates the group of non-designated nodes. This is done at time 0.1 seconds—4.9 seconds before any node would receive the update under the OSPF standard approach. This step represents a significant improvement over the standard approach because, even if the re-flood time is the same as the re-transmission time, the standard approach would have the BDR begin a large number of unicasts whereas step 350 sends a single multicast. If it is assumed for purposes of illustration that segment 130 has 1000 routers 120, then the standard approach would have the BDR execute 997 unicasts, consuming many times the network resources consumed by sending a single multicast according to step 350. If the re-flood time is much less than the re-transmission time, as in the example, then the new approach begins the update process at a time (e.g., 0.1 seconds) when no update messages would be under the standard approach and no progress would be made in converging to a new route for the network 102. In some embodiments step 350 includes staring a re-transmission timer at the re-transmission time value. For example, a re-transmission timer is set to 5 seconds, which would expire at 5.1 seconds after the update was received by the BDR. In the illustrated embodiment, the re-transmission timer was already started in step 320 and is not restarted during step 320. Control then passes to step 352

In step 352, the re-flood time is set to zero instead of the non-zero value. This is done in case the DR has failed, so that the BDR responds immediately to the next update message sent by a non-designated router on the multi-access segment. Thus the BDR sends a multicast in response to the next update immediately, instead of waiting 0.1 seconds. During step 352, the BDR also removes from the unresponsive list any node that acknowledges the multicast update message and waits until the re-transmission timer expires. When the re-transmission time expires, control passes to step to step 360. For example, 5 seconds after the update message was received at the BDR 129 from router 121c, control passes to step 360.

In step 360 it is determined whether any update message has been received from the DR. If so, then the DR has not failed or has failed and has been replaced, and control passes to step 362. In step 362, the re-flood time is set back to a non-zero value. For example, the re-flood time is reset to 0.1 seconds. The BDR no longer advantageously responds immediately to the next update message sent by a non-designated router on the multi-access segment, because the active DR will respond immediately. Control then passes to step 364. In some embodiments, step 360 and step 362 are performed earlier, e.g., after step 320 and before step 330 and control passes to step 330 instead of to step 370 after step 362. Control then passes from step 352 directly to step 320.

In step 364, it is determined whether any of the updates from the DR indicate the sequence number of the message for which the re-transmission timer has expired. If so, then the DR has the routing information to send unicast update messages to the unresponsive nodes; and the BDR does not advantageously also send unicast update messages to those nodes. Thus, control passes back to step 320 so that the BDR awaits the next update message from a non-designated node.

If it is determined, in step 364, that none of the updates from the DR indicate the sequence number of the message for which the re-transmission timer has expired, control passes to step 370. If it is determined, in step 360, that no update message has been received from the DR, control also passes to step 370. In some embodiments, step 364 is omitted; and control passes directly from step 362 to step 370.

In step 370, the BDR sends unicast routing updates messages to the unresponsive nodes. Either there is no DR, or the DR has not shown an ability to send an update message associated with the sequence number for which the re-transmission timer has expired. When the unicasts are completed in step 370, then control passes back to step 320 to await the next update message from a non-designated node. It is assumed for purposes of illustration that as of time 5.0 seconds after receipt of the update message from router 121c, routers 124a, 124b, 124c have not responded with acknowledgement messages. During step 370, unicast update messages are sent to routers 124a, 124b, 124c. In a great advantage over the standard approach, unicast messages are sent only to three routers and not sent to all 550 to 1000 routers 120.

As illustrated in the example, using the steps of method 300, recovery from failure of DR 128 occurs with one multicast update message at 0.1 seconds and three unicast update messages at 5.0 seconds. Under the standard approach, recovery from failure of DR 128 involves 997 unicast messages starting at 5.0 seconds. It is assumed for purposes of illustration that each unicast update message takes about 0.00016 seconds on a 100 MHz link, so that the 3 unicast update messages at 5.0 seconds takes only about 0.00048 seconds while the 997 unicast update messages take about 0.16 seconds. Thus recovery is faster by about 160 milliseconds and consumes substantially less bandwidth on segment 130 and substantially less processing power at BDR 129. In general, using the method 300, recovery from DR failure is faster and consumes less bandwidth and less processing power.

4.0 Implementation Mechanisms—Hardware Overview

Figure 4:
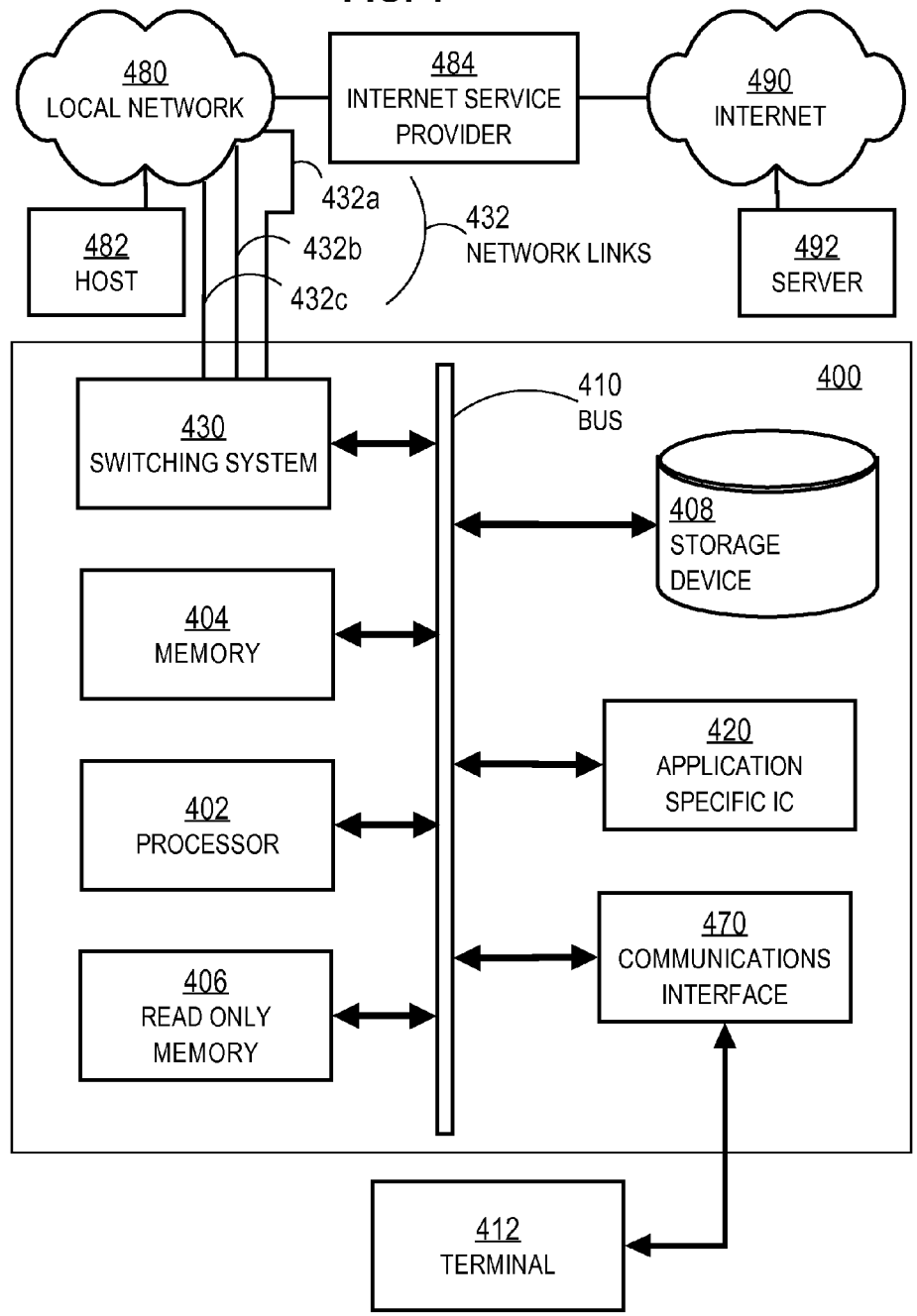
FIG. 4 illustrates a computer system upon which an embodiment of the invention may be implemented.

FIG. 4 illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

The term computer-readable medium is used herein to refer to any medium that participates in providing information to processor 402, including instructions for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 410 for use by the processor from an external terminal 412, such as a terminal with a keyboard containing alphanumeric keys operated by a human user, or a sensor. A sensor detects conditions in its vicinity and transforms those detections into signals compatible with the signals used to represent information in computer system 400. Other external components of terminal 412 coupled to bus 410, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 412. In some embodiments, terminal 412 is omitted.

Computer system 400 also includes one or more instances of a communications interface 470 coupled to bus 410. Communication interface 470 provides a two-way communication coupling to a variety of external devices that operate with their own processors, such as printers, scanners, external disks, and terminal 412. Firmware or software running in the computer system 400 provides a terminal interface or character-based command interface so that external commands can be given to the computer system. For example, communication interface 470 may be a parallel port or a serial port such as an RS-232 or RS-422 interface, or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 400 includes switching system 430 as special purpose hardware for switching information for flow over a network. Switching system 430 typically includes multiple communications interfaces, such as communications interface 470, for coupling to multiple other devices. In general, each coupling is with a network link 432 that is connected to another device in or attached to a network, such as local network 480 in the illustrated embodiment, to which a variety of external devices with their own processors are connected. In some embodiments an input interface or an output interface or both are linked to each of one or more external network elements. Although three network links 432a, 432b, 432c are included in network links 432 in the illustrated embodiment, in other embodiments, more or fewer links are connected to switching system 430. Network links 432 typically provides information communication through one or more networks to other devices that use or process the information. For example, network link 432b may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides routing information for use with switching system 430.

The switching system 430 includes logic and circuitry configured to perform switching functions associated with passing information among elements of network 480, including passing information received along one network link, e.g. 432a, as output on the same or different network link, e.g., 432c. The switching system 430 switches information traffic arriving on an input interface to an output interface according to pre-determined protocols and conventions that are well known. In some embodiments, switching system 430 includes its own processor and memory to perform some of the switching functions in software. In some embodiments, switching system 430 relies on processor 402, memory 404, ROM 406, storage 408, or some combination, to perform one or more switching functions in software. For example, switching system 430, in cooperation with processor 404 implementing a particular protocol, can determine a destination of a packet of data arriving on input interface on link 432a and send it to the correct destination using output interface on link 432c. The destinations may include host 482, server 492, other terminal devices connected to local network 480 or Internet 490, or other routing and switching devices in local network 480 or Internet 490.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420 and circuits in switching system 430, may be used in place of or in combination with software to implement the invention. Thus, embodiments of the invention are not limited to any specific combination of hardware and software.

The signals transmitted over network link 432 and other networks through communications interfaces such as interface 470, which carry information to and from computer system 400, are example forms of carrier waves. Computer system 400 can send and receive information, including program code, through the networks 480, 490 among others, through network links 432 and communications interfaces such as interface 470. In an example using the Internet 490, a server 492 transmits program code for a particular application, requested by a message sent from computer 400, through Internet 490, ISP equipment 484, local network 480 and network link 432b through communications interface in switching system 430. The received code may be executed by processor 402 or switching system 430 as it is received, or may be stored in storage device 408 or other non-volatile storage for later execution, or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 432b. An infrared detector serving as communications interface in switching system 430 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402 or switching system 430.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
receiving routing update data that indicates a change to link-state data from an updating node of a plurality of network nodes at a backup node;
receiving election data and configuration data at the backup node, wherein the election data includes an identification of a designated node configured for propagating updated messages to the plurality of network nodes based on the routing update data received from the updating node, wherein the configuration data including a retransmission time for shifting from a multicast protocol to a unicast protocol for unresponsive network nodes;
setting a re-flood time to a non-zero first value at the backup node;
starting the retransmission time at the backup node;
sending through an interface, an outbound single multicast data packet that includes the routing update data from the backup node to the plurality of nodes if a particular node's response to an updated message from the designated node is not received at the backup node within the re-flood time; and
propagating a unicast message that includes the routing update data to each node in the plurality of network nodes that did not send a response to the outbound multicast data packet to the backup node within the retransmission time.

2. A method as recited in claim 1, wherein the non-zero first value is less than about 0.5 seconds.

3. A method as recited in claim 1, wherein the non-zero first value is less than about 0.1 seconds.

4. A method as recited in claim 1, further comprising:
setting the re-flood time to a different second value that is approximately equal to zero.

5. A method as recited in claim 4, further comprising:
receiving, through the interface, an inbound single multicast data packet that is directed to the plurality of network nodes and that includes the routing update data; and
setting the re-flood time to the non-zero first value.

6. An apparatus comprising:
means for receiving routing update data that indicates a change to link-state data from an updating node of a plurality of network nodes at a backup node;
means for receiving election data and configuration data at the backup node, wherein the election data includes an identification of a designated node configured for propagating updated messages to the plurality of network nodes based on the routing update data received from the updating node, wherein the configuration data including a retransmission time for shifting from a multicast protocol to a unicast protocol for unresponsive network nodes;
means for setting a re-flood time to a non-zero first value at the backup node;
means for starting the retransmission time at the backup node;
means for sending through an interface, an outbound single multicast data packet that includes the routing update data from the backup node to the plurality of nodes if a particular node's response to an updated message from the designated node is not received at the backup node within the re-flood time; and
means for propagating a unicast message that includes the routing update data to each node in the plurality of network nodes that did not send a response to the outbound multicast data packet to the backup node within the retransmission time.

7. An apparatus as recited in claim 6, wherein the non-zero first value is less than about 0.5 seconds.

8. An apparatus as recited in claim 6, wherein the non-zero first value is less than about 0.5 seconds.

9. An apparatus as recited in claim 6, further comprising means for setting the re-flood time to a different second value that is approximately equal to zero, if it is determined that an acknowledgment message is not received from the particular node within the re-flood time.

10. An apparatus as recited in claim 9, further comprising:
means for receiving, through the interface, an inbound single multicast data packet that is directed to the plurality of network nodes and that includes the routing update data; and
means for setting the re-flood time to the non-zero first value in response to receiving the inbound single multicast data packet.

11. An apparatus comprising:
a network interface that is configured for communicating a data packet in a network;
logic encoded in one or more tangible media and, when executed by a processor is operable to perform operations including:
receiving routing update data that indicates a change to link-state data from an updating node of a plurality of network nodes at a backup node;
receiving election data and configuration data at the backup node, wherein the election data includes an identification of a designated node configured for propagating updated messages to the plurality of network nodes based on the routing update data received from the updating node, wherein the configuration data including a retransmission time for shifting from a multicast protocol to a unicast protocol for unresponsive network nodes;
setting a re-flood time to a non-zero first value at the backup node;
starting the retransmission time at the backup node;
sending through an interface, an outbound single multicast data packet that includes the routing update data from the backup node to the plurality of nodes if a particular node's response to an updated message from the designated node is not received at the backup node within the re-flood time; and
propagating a unicast message that includes the routing update data to each node in the plurality of network nodes that did not send a response to the outbound multicast data packet to the backup node within the retransmission time.

12. An apparatus as recited in claim 11, wherein the non-zero first value is less than about 0.5 seconds.

13. An apparatus as recited in claim 11, wherein the non-zero first value is less than about 0.1 seconds.

14. An apparatus as recited in claim 11, wherein the logic, when executed, is further operable, if it is determined that an acknowledgment message is not received from the particular node within the re-flood time, to perform the step of setting the re-flood time to a different second value that is approximately equal to zero.

15. An apparatus as recited in claim 14, wherein the logic, when executed, is further operable to perform:

receiving, through the interface, an inbound single multicast data packet that is directed to the plurality of network nodes and that includes the routing update data; and setting the re-flood time to the non-zero first value.

16. A backup node, comprising:

a processor;

a memory; and an interface, wherein the backup node is configured for:

receiving routing update data that indicates a change to link-state data from an updating node of a plurality of network nodes;

receiving election data and configuration data, wherein the election data includes an identification of a designated node configured for propagating updated messages to the plurality of network nodes based, at least in part, on the routing update data received from the updating node, wherein the configuration data includes a retransmission time for shifting from a multicast protocol to a unicast protocol for unresponsive network nodes;

setting a re-flood time to a non-zero first value;

starting the retransmission time;

sending an outbound single multicast data packet that includes the routing update data to the particular node if the particular node's response to an updated message from the designated node is not received at the backup node within the re-flood time; and propagating a unicast message that includes the routing update data to the plurality of network nodes that did not send a response to the multicast data packet to the backup node within the retransmission time.

17. The backup node of claim 16, wherein the backup node is a backup designated router (BDR) that includes at least one routing table.

18. The backup node of claim 16, wherein the backup node is further configured for:

executing an Open Shortest Path First (OSPF) protocol to propagate routing information to one or more neighboring routers.

19. The backup node of claim 16, wherein the backup node is further configured for:

receiving an inbound single multicast data packet that includes multicast data indicating the change to the link data based on the update data.

20. The backup node of claim 16, wherein the backup node is further configured for:

determining that an acknowledgment message is not received from the particular node within the re-flood time; and setting the re-flood time to a different second value that is approximately equal to zero.

* * * * *